June 7, 1932. J. J. HANNAH 1,862,399
AUTOMATIC BEET HARVESTER
Filed Oct. 20, 1930  3 Sheets-Sheet 3
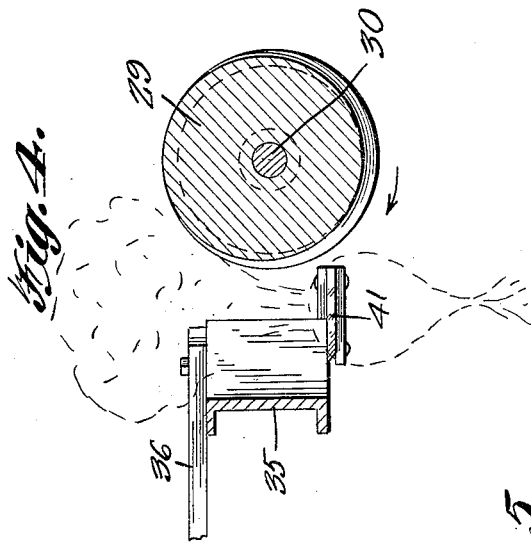
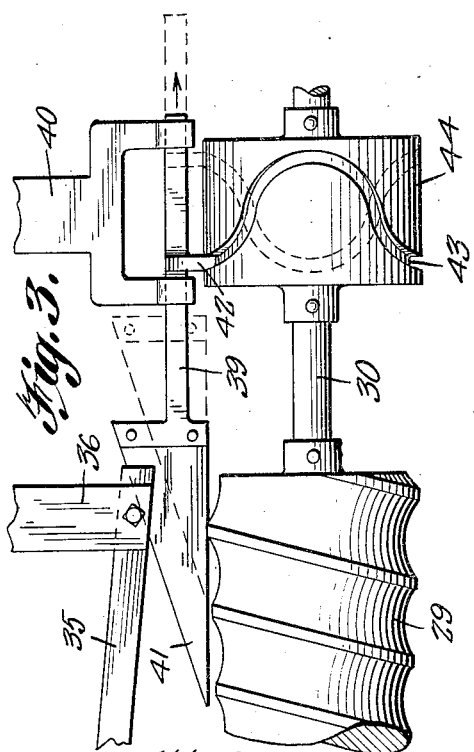
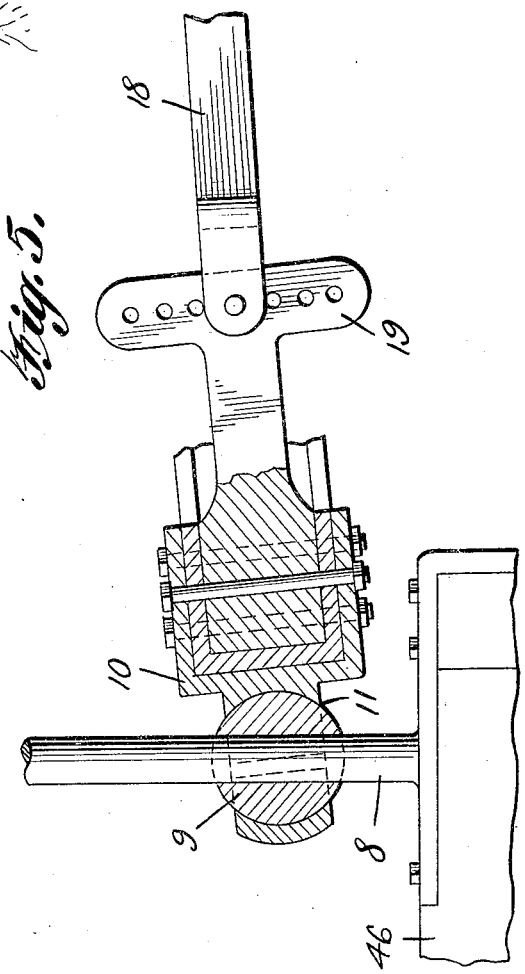
James J. Hannah, INVENTOR
BY Victor J. Evans ATTORNEY
WITNESS: P. T. Hickey Patented June 7, 1932

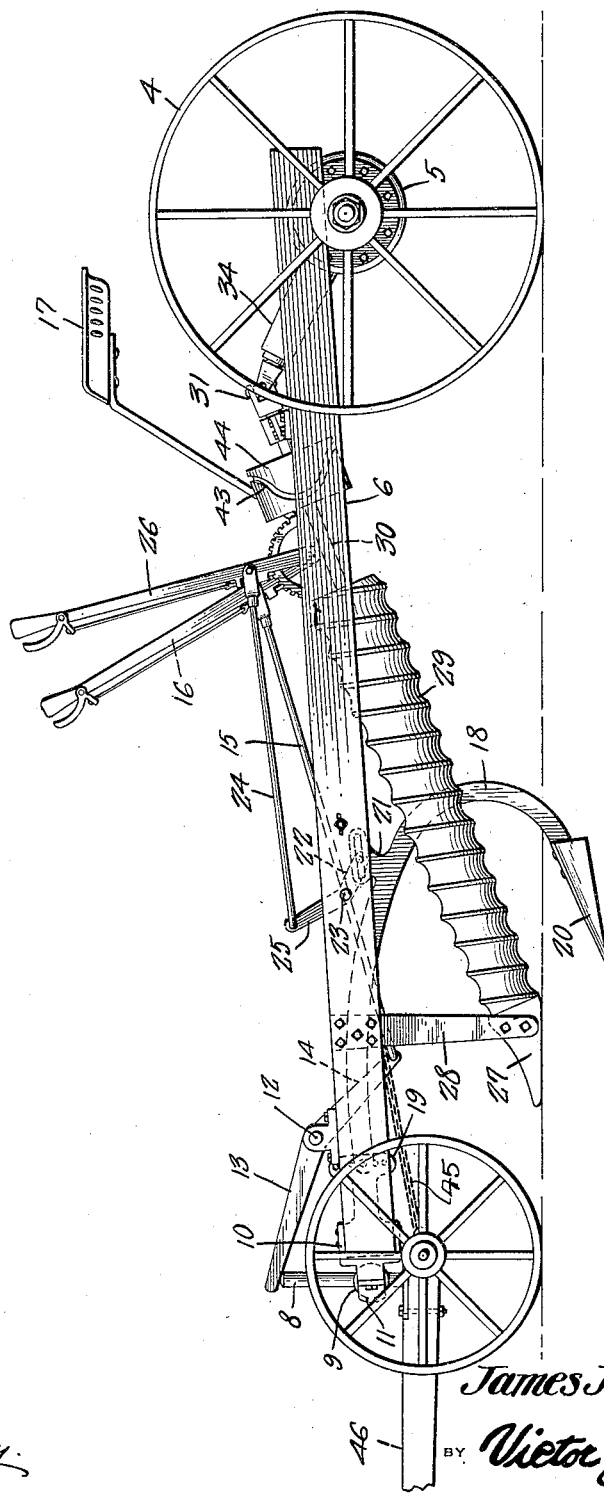

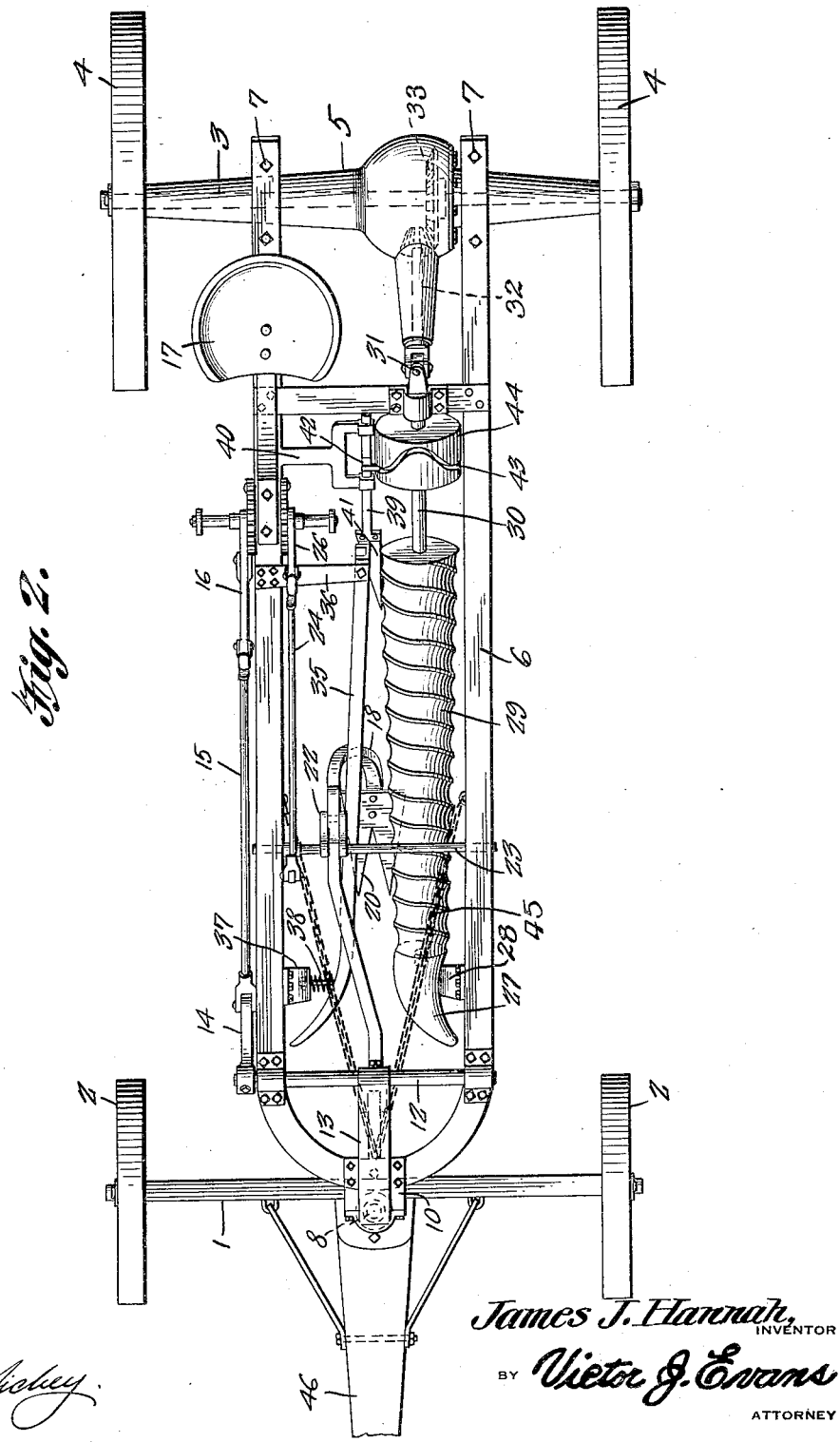

1,862,399

UNITED STATES PATENT OFFICE

JAMES JOSEPH HANNAH, OF CANON CITY, COLORADO

AUTOMATIC BEET HARVESTER

Application filed October 20, 1930. Serial No. 489,995.

This invention relates to a beet harvester, the general object of the invention being to provide means for gripping the tops of the beets and moving the same upwardly and rearwardly after the beets have been lifted by a plow, with means for cutting the tops off the beets at the rear end of the conveying means so that the beets can be harvested quickly and with the minimum amount of labor.

Another object of the invention is to provide means for adjusting the plow and the conveying means and for operating the cutting means and the conveying means from the rear shaft of the machine.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which :—

Figure 1 is an elevation of the implement.

Figure 2 is a top plan view thereof.

Figure 3 is an enlarged plan view showing the cutting means at the rear end of the spiral conveying roller.

Figure 4 is a vertical transverse sectional view thereof.

Figure 5 is a detail view showing the means for slidably connecting the front of the frame with the front axle.

In these drawings, the numeral 1 indicates the front axle having the wheels 2 at its ends and the numeral 3 indicates the rear axle having the wheels 4 at its ends. The rear axle is enclosed in the housing 5 and a substantially U-shaped frame 6 has the rear ends of its limbs pivotally connected with the housing, as shown at 7. A post 8 is carried by the front axle and a spherical member 9 has a hole therein through which the post passes so that the member is slidably arranged on the post.

A bracket 10 is fastened to the central part of the bight of the frame 6 and has a projecting part formed with a socket 11 to receive the member 9 so that the front end of the frame 6 can be raised and lowered on the post.

A shaft 12 is journaled in the front part of the frame and has a forwardly extending arm 13 thereon which contacts the upper end of the post. An arm 14 is fastened to one end of the shaft and a link 15 connects the free end of the arm with a hand lever 16 carried by the frame adjacent the seat 17 on the frame. Thus by manipulating this lever, the parts 12, 13 and 14 are adjusted to raise and lower the frame.

A curved beam 18 has its front end adjustably connected to a clevis 19 which is fastened in the central part of the bight of the frame 6 and a forked plow 20 is fastened to the lower end of the beam. The beam is formed with a slotted upwardly extending part 21, through the slot of which a crank 22 of a shaft 23 passes. The shaft is journaled in the frame 6 and a link 24 connects an arm 25 on the shaft with a hand lever 26 pivoted to the frame adjacent the seat 17. Thus by manipulating the lever 26, the plow can be raised and lowered.

A forwardly curved and tapered member 27 is fastened to the lower end of a hanger 28 on the frame at one side thereof and a tapered spiral member 29 has its forward end pivotally arranged in the rear part of the member 27. A shaft 30 is fastened to the rear end of the spiral member 29 and is connected by the universal joint 31 with a shaft 32 which is connected by the gears 33 with the rear shaft 3 so that the spiral member 29 will be rotated as the implement travels along. The shaft 32 is journaled in an extension 34 of the housing 5. The member 29 is of considerable length and inclines downwardly and forwardly and acts as a conveyor, as will be hereinafter described.

The members 29 and 28 are located to one side of the longitudinal center of the frame and a channel bar 35 is located to the opposite side of said center and is pivotally supported at its rear end by a bracket 36 carried by the frame and has its front end, which curves outwardly, yieldably supported from a hanger 37 through means of the spring means, shown generally at 38. The bar 35 also inclines downwardly and forwardly and the curved forward end of the bar and the curve of the member 28 form a wide mouth for the receiving space formed by the bar 35 and the member 29. These members are so located that the space between them gradually tapers rearwardly, as shown in Figure 2. The plow 20 is in alignment with the forward part of the space.

A knife bar 39 is slidably supported in the bracket 40 carried by the frame and a knife 41 is fastened to the forward end of the bar. This bar carries a pin 42 which engages a cam groove 43 in a cylinder 44 fastened to the shaft 30 so that during the rotation of the shaft 30, the knife is reciprocated and said knife is arranged at the rear part of the space between the members 35 and 29.

Chains 45 connect side portions of the frame 6 with the front axle and a tongue 46 is connected with the axle.

From the foregoing it will be seen that when the implement is moved forwardly, the member 39 and the cam member 44 are actuated from the rear shaft and when the frame 6 is lowered through means of the lever 16, the member 27 will slide on the ground. The plow is adjusted through means of the lever 26. As the device travels along, the tops of the beets are engaged by the member 27 and the forward end of the bar 35 so that the tops are guided into the space between the members 29 and 35, where they will be engaged by the grooves of the spiral member 29. The plow acts to lift the beets out of the ground and the spiral member, engaging the tops of the beets, will move the beets upwardly until they strike the members 29 and 35 and then the beets are carried upwardly and rearwardly to the knife, which acts to sever the tops from the beets, the beets dropping into the furrow left by the plow and the tops dropping to the right of the furrow so that the beets are separated from the tops. Thus I have provided a beet harvester in which the beets are lifted from the ground and their tops cut therefrom very quickly and with the minimum amount of labor.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A beet harvester comprising front and rear axles, wheels carried thereby, a frame having its rear end rotatably supported from the rear axle, means for supporting the front end of the frame from the front axle for vertical movement, manually operated means for raising and lowering the front of the frame, a plow carried by the frame, means for adjusting the same vertically, an outwardly curved and forwardly tapered member supported from the frame and adapted to engage the ground, a tapered spirally grooved member having its front end rotatably arranged in said tapered member, said spiral member extending upwardly and rearwardly, a shaft connected with the rear end of said member, means for driving the shaft from the rear axle, a bar supported from the frame and diverging from the spiral member and having its forward end curving outwardly, said spiral member and the bar forming conveying means for conveying the beets from the plow rearwardly by engagement of the tops of the beets by the grooved portions of the spiral member, a knife for severing the tops from the beets at the rear end of the spiral member and a cam member on the driven shaft for reciprocating the knife.

In testimony whereof I affix my signature.

JAMES JOSEPH HANNAH.